Oct. 16, 1945.   J. H. LESLIE, 2D   2,386,807
PRESSURE RESPONSIVE SWITCH
Filed July 17, 1944   2 Sheets-Sheet 1
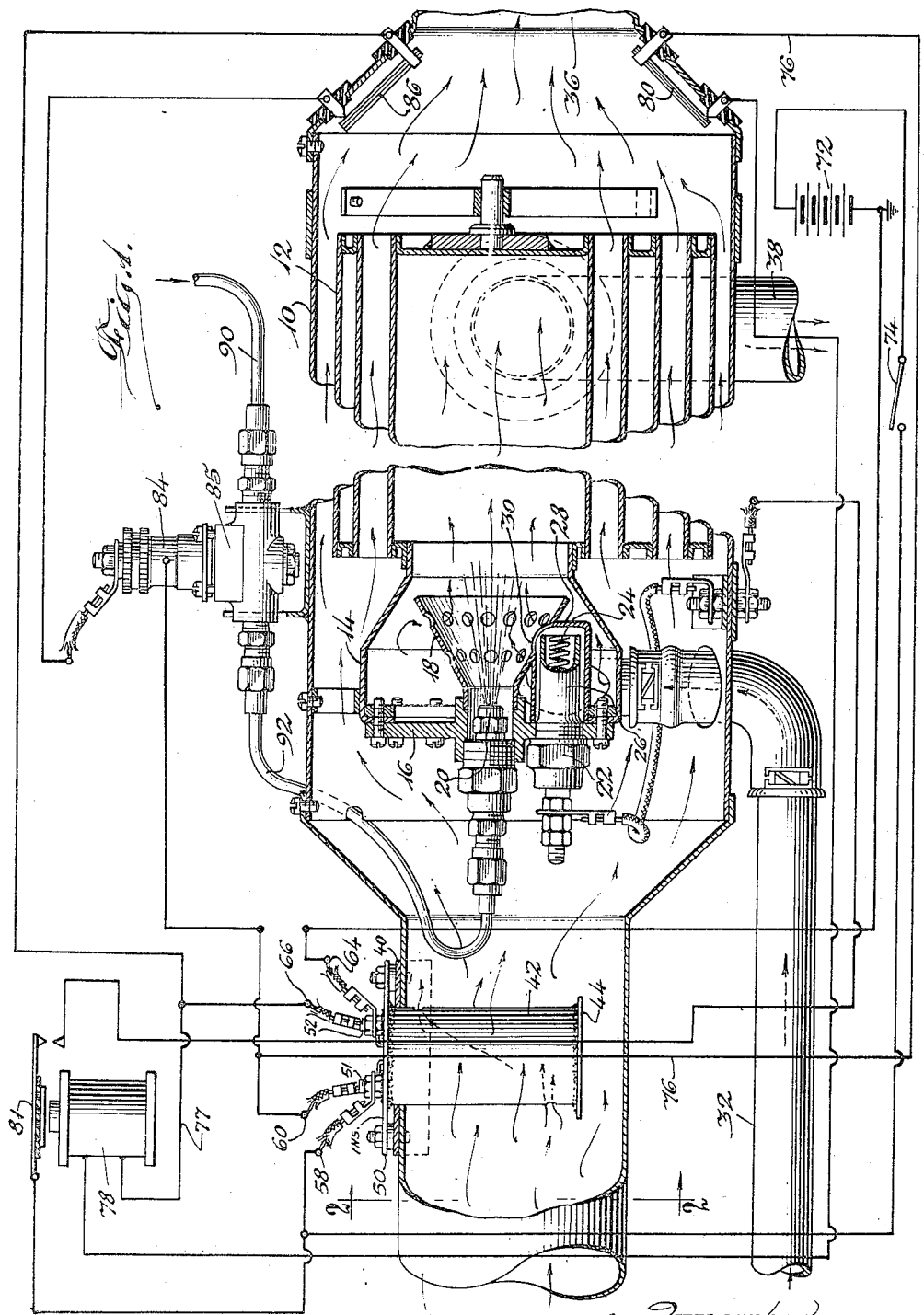
Inventor:
John H. Leslie II
By Williams, Bradbury & Hinkle
Attorneys.

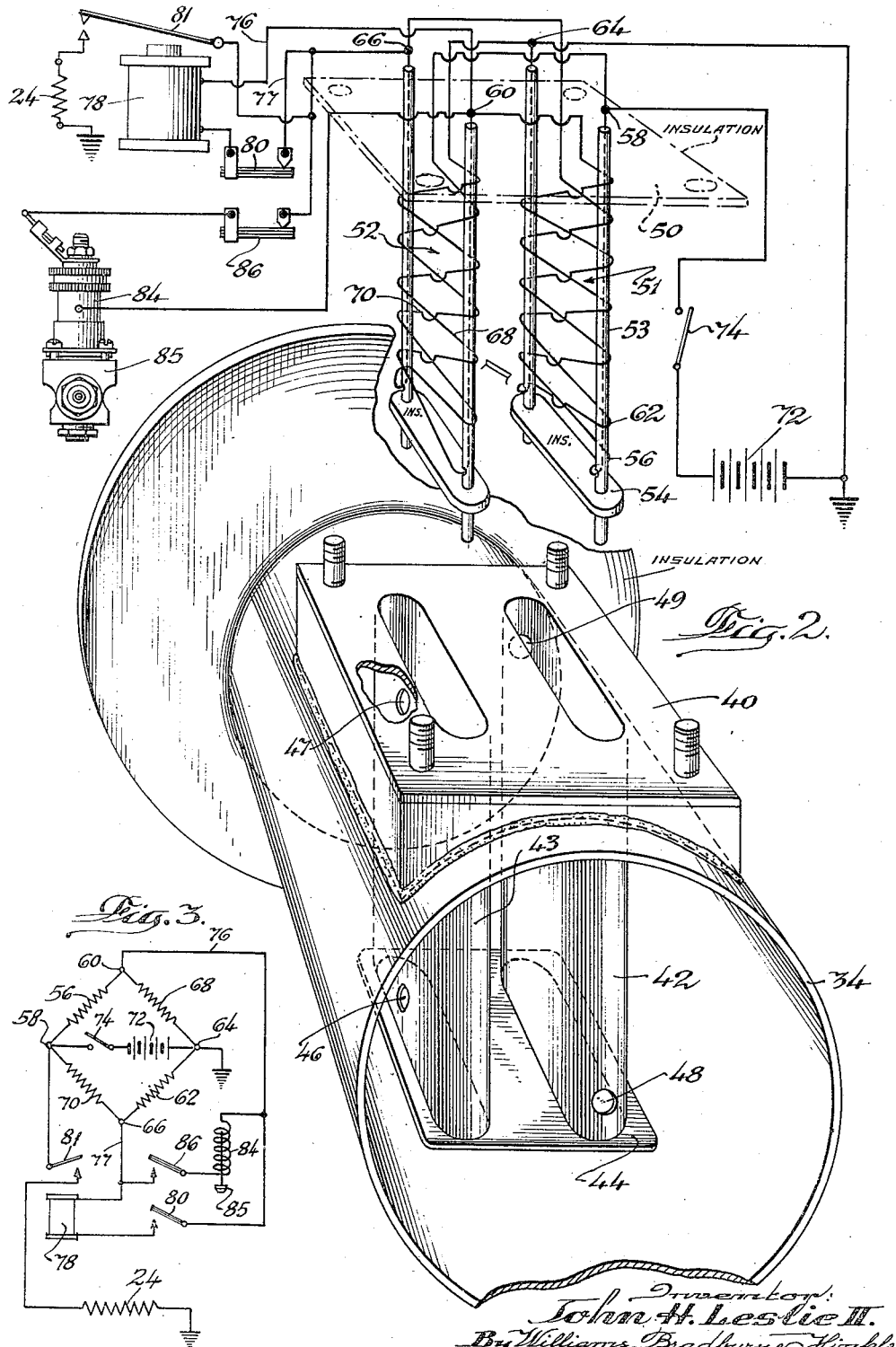

Patented Oct. 16, 1945

2,386,807

UNITED STATES PATENT OFFICE 2,386,807

PRESSURE RESPONSIVE SWITCH

John H. Leslie, II, Winnetka, Ill., assignor to Stewart-Warner Corporation, Chicago, Ill., a corporation of Virginia Application July 17, 1944, Serial No. 545,296

4 Claims. (Cl. 126—110)

My invention relates generally to control apparatus for heaters and the like, and more particularly to a pressure responsive switch means.

In controlling heaters, particularly heaters of the sealed combustion type for aircraft use, it is desirable to provide a means responsive to the dynamic pressure of the air flowing through the heater to determine the character of the operation of the heater.

In aircraft heaters in which the supply of air, either for ventilation or combustion, is obtained from a ram or scoop, the pressure differences available for control purposes are at times very small, and any mechanical apparatus which would be responsive to such slight pressure differences would, for reliability in operation, necessarily have a relatively large diaphragm or similar part subjected to the differential air pressure. As a result, such devices have in the past been rather bulky and subject to erroneous operation due to the vibration of the airplane.

It is thus an object of my invention to provide an improved apparatus which is responsive to relatively slight differences in pressure, and which may be utilized to complete electrical control circuits in response to predetermined small changes in pressure, to prevent operation of the heater unless ventilating air is flowing through the heater at an adequate flow rate.

A further object is to provide an improved pressure responsive switch mechanism for the control of the operation of an aircraft heater or similar apparatus.

A further object is to provide an improved pressure responsive control apparatus in which the differential pressures available result in the flow of air which has a cooling effect upon the opposite pairs of resistance wires of a resistance bridge circuit, in which the other legs are not subject to the cooling effect of air flowing in response to the controlling pressure differential, whereby a voltage is developed across the output of the bridge circuit, and this voltage may be used for control purposes.

A further object is to provide an improved control circuit and apparatus for heating apparatus and the like.

Other objects will appear from the following description, reference being had to the accompanying drawings, in which:

Fig. 1 is a central longitudinal sectional view of a sealed combustion type aircraft heater, the figure also including a schematic wiring diagram;

Fig. 2 is an exploded view of the pressure responsive element and associated conduit, also including a partially schematic wiring diagram; and Fig. 3 is a simplified schematic wiring diagram of the apparatus.

Referring to Fig. 1, the heater shown for purposes of illustration comprises an outer casing 10 containing a heat exchanger 12 which may be of any suitable construction, a combustion chamber head 14 being secured to the heat exchanger 12 and provided with an end closure plate 16. Within the head 14 is secured a conical perforated baffle 18 and a centrally located fuel injecting nozzle 20. Also secured to the plate 16 is a suitable igniter 22 comprising a high resistance wire 24 located within a shell 26. The shell 26 is surrounded by a shield 28 which is cut away adjacent the baffle 18 to provide a relatively large opening 30 for the flow of fuel and air into the shield 28 where it may be ignited. Air for combustion is provided through a conduit 32 which communicates with the space within the combustion chamber head 14, directing the air tangentially so that it follows a generally helical path around the baffle 18.

Ventilating air is supplied to the heater through an inlet duct 34 while the heated ventilating air is conveyed to the space to be heated by a conduit 36. The products of combustion are discharged from the heat exchange through a conduit 38 extending to the atmosphere.

As best shown in Fig. 2, a mounting plate 40 is suitably secured to the ventilating air duct 34 and has attached thereto a pair of casings 42, 43, the lower ends of which are secured to a connecting plate 44. The casing 43 is provided with a pair of openings 46, 47 in a side wall thereof, while the casing 42 has an upstream directed opening 48 adjacent the inner or bottom end thereof, and an opening 49 facing downstream adjacent the outer or upper end thereof. A cover plate 50, preferably of insulating material, is adapted to be secured against the mounting plate 40, and carries a pair of wire supports 51, 52. Each of these supports comprises a pair of tubular insulators 53 secured at their upper ends to the plate 50 and at their lower ends by a strap 54 of insulating material. Wound upon the support 51 is a resistance wire 56 extending between junction terminals 58 and 60, the wire extending through one of the tubular insulators 53. A second wire 62 is similarly wound upon the support 51, having its ends connected to junction terminals 64 and 66, respectively. In a similar manner, a wire 68 is wound upon the support 52 and extends between junction terminals 60 and 64, while a fourth wire 70 is wound on the support 62 and has its ends connected to the junction points 58 and 66.

The wires 56, 62, 68, and 70, are thus connected in a Wheatstone or resistance bridge network. These wires are preferably made of iron or similar metal or alloy having a high temperature coefficient of resistivity, each of the wires forming one leg of the bridge circuit. The input terminals 58 and 64 of the bridge circuit are adapted to be connected across a suitable source of energizing current, indicated as a battery 72, upon closure of a manually operated main control switch 74. The input terminal 64 is preferably grounded. The output terminals 60 and 66 are connected by conductors 76 and 77 to the winding of a relay 78 in series with a thermostatic igniter switch 80. The armature 82 of the relay 78 is suitably connected to the input junction 58, and upon energization of the relay, is adapted to complete a series circuit including the battery 72 and the electrical resistance wire igniter 24. The latter circuit is completed through ground, to which one terminal of the battery 72 is connected.

Also connected across the output terminals 60, 66, is a series circuit comprising a thermostatic overheat switch 86 and the winding 84 of a solenoid operated valve 85. The winding 84, and the winding of the relay 78, may be of a high impedance so as not to affect appreciably the voltage which is produced across the output terminals 60, 66. Since the igniter 24 draws considerable current, its energizing circuit is completed by the switch 81 of the relay 78 and the igniter does not constitute a load across the output terminals of the bridge circuit.

From the foregoing it will appear that when there is no appreciable pressure drop in the ventilating air stream of the heater, and hence no appreciable air flow, the resistance wires 56, 62, 68, and 70 will be heated to equally high temperatures upon closure of the main switch 74. These resistance wires will be subjected to cooling solely due to radiation and the flow of air by convection into the lower openings 46, 48, and out of the upper openings 47, 49. Thus any changes in ambient temperature will not have any effect upon the potential across the output terminals 60, 66. The wires 56, 62, 68, 70, are preferably of equal gauge and length, and thus will present equal resistances at any given temperature.

When, however, differential air pressure exists in the ventilating air stream and air flows through the inlet duct 34, a greater amount of air will flow through the casing 42 than through the casing 43, and thus the resistances 56, 62 will have heat carried away therefrom at a higher rate than from the wires 68, 70. The dynamic pressure of the air flow will increase the rate of flow through the casing 42, but will not have any appreciable effect upon the rate of flow through the casing 43.

Thus, whenever air commences flowing in the inlet duct 34, a substantial potential will be built up across the output terminals 60, 66, due to the high temperature coefficient of resistivity of the resistance wires. This potential, assuming that the overheat thermostatic switch 86 is closed, will result in energization of the solenoid valve 84, 85, opening the latter to permit flow of fuel to the nozzle 20. At the same time, assuming the igniter thermostatic switch 80 is closed, the relay 78 will be energized, and, by closure of its switch 81, complete the circuit to the igniter 24. Thereupon, the igniter will be heated to ignition temperature and ignite the fuel and air mixture supplied to the combustion chamber. After the heater has been in operation for a short time, the temperature near the outlet duct 36 will rise sufficiently to open the igniter thermostatic switch 80, thus deenergizing the relay 78 and opening the igniter circuit.

If, due to any abnormal condition, the ventilating air should be heated to a temperature exceeding a predetermined safe value, the overheat switch 86 will open and deenergize the solenoid valve 84, 85, whereupon the latter will close (it being of a spring closed type) and the operation of the heater will be stopped by cutting off the supply of fuel thereto. If at any time the supply of ventilating air should be substantially stopped, the resistance wires of the bridge circuit will quickly be heated to substantially the same temperature, whereupon there will be no substantial potential difference across the output terminals 60, 66. As a result, the solenoid valve 84, 85 and the relay 78 will be deenergized, thus shutting off the supply of fuel to the heater and assuring deenergization of the igniter 24. The bridge circuit apparatus thus provides a simple and effective safety control, which makes it necessary that an adequate stream of ventilating air be flowing through the heater while the heater is in operation, and assures that the supply of fuel to the heater will promptly be cut off upon interruption of adequate flow in the ventilating air stream.

In installations of the heater in which the ventilating air is supplied by a ram or a scoop, it will be clear that when the airplane lands and the engines have been stopped, the heater will be automatically stopped even through the main switch 74 is inadvertently left closed. Similarly, if it is attempted to start the heater, or the switch 74 is closed inadvertently, while the plane is not in flight, neither the igniter nor the solenoid valve will be energized and therefore the heater will not commence operation. On the other hand, if the ventilating air for the heater is supplied from a blower, failure of the blower to operate will result in deenergization of the igniter and the solenoid valve. In any case, the heater will not commence operating if the supply of ventilating air is inadequate, and will stop burning in the event that the flow of ventilating air through it becomes inadequate. In either case the heater will commence operation shortly after ventilating air is again supplied at an adequate rate, assuming that the main switch 74 is closed.

While I have shown and described a particular embodiment of my invention, it will be apparent that numerous variations and modifications thereof may be made without departing from the underlying principles of the invention. I therefore desire, by the following claims, to include within the scope of my invention all such variations and modifications by which substantially the results of my invention may be obtained through the use of substantially the same or equivalent means.

I claim:

1. In a heater for aircraft and the like having a duct means for the supply of ventilating air, a heat exchanger, a combustion chamber connected thereto, an electrical igniter for the ignition of a fuel mixture in the combustion chamber, means for supplying air for combustion to the combustion chamber, and a solenoid valve controlling the flow of fuel to the combustion chamber, a control apparatus comprising: a pair of similar casings symmetrically positioned in the ventilating air stream, one of said casings having openings directed respectively upstream and downstream and the other casing having sidewardly facing openings, a pair of conductors in each of said casings, said conductors having a relatively high temperature coefficient of resistivity, means connecting said conductors to form a resistance bridge network having input terminals and output terminals, means for supplying an operating potential across said input terminals, a thermostatic overheat switch, a thermostatic igniter switch, a relay, a circuit across the output terminals including said overheat switch and said solenoid valve in series, a second circuit across said output terminals including said igniter switch and said relay, and an igniter energizing circuit completed by said relay.

2. In a heater for aircraft and the like having a duct means for the supply of air thereto, a heat exchanger, a combustion chamber connected to the heat exchanger, an electrical igniter for the ignition of a fuel mixture in the combustion chamber, and a solenoid valve controlling the flow of fuel to the combustion chamber, a control apparatus comprising: a pair of similar casings symmetrically positioned in the ventilating air stream, one of said casings having openings directed respectively upstream and downstream and the other casing having sidewardly facing openings, a pair of conductors in each of said casings, said conductors having a relatively high temperature coefficient of resistivity, means connecting said conductors to form a resistance bridge network having input terminals and output terminals, means for supplying an operating potential across said input terminals, a thermostatic overheat switch, and a circuit across the output terminals including said overheat switch and said solenoid valve in series.

3. In a heater for aircraft and the like having a duct means for the supply of air thereto, a heat exchanger, a combustion chamber, an electrical igniter for the ignition of a fuel mixture in the combustion chamber, and a solenoid valve controlling the flow of fuel to the combustion chamber, a control apparatus comprising: a resistance bridge network having input terminals and output terminals and located to be responsive to the rate of mass flow of air through said duct, means for supplying an operating potential across said input terminals, a thermostatic overheat switch, and a circuit across the output terminals including said overheat switch and said solenoid valve in series.

4. In a heater for aircraft and the like having a duct means for the supply of air thereto, a heat exchanger, a combustion chamber, an electrical igniter for the ignition of a fuel mixture in the combustion chamber, and a solenoid valve controlling the flow of fuel to the combustion chamber, a control apparatus comprising: a resistance bridge network having input terminals and output terminals and located to be responsive to the rate of mass flow of air through said duct, means for supplying an operating potential across said input terminals, a thermostatic igniter switch, a relay, a circuit across said output terminals including said igniter switch and said relay, and an igniter energizing circuit completed by said relay.

JOHN H. LESLIE, II.